(12) United States Patent
Haslam

(10) Patent No.: US 8,979,968 B2
(45) Date of Patent: Mar. 17, 2015

(54) RADIOLOGICAL/BIOLOGICAL/AEROSOL REMOVAL SYSTEM

(75) Inventor: Jeffery J. Haslam, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 211 days.

(21) Appl. No.: 13/607,129

(22) Filed: Sep. 7, 2012

(65) Prior Publication Data

US 2013/0068098 A1    Mar. 21, 2013

Related U.S. Application Data

(60) Provisional application No. 61/535,285, filed on Sep. 15, 2011.

(51) Int. Cl.
| | | |
|---|---|---|
| B01D 39/00 | (2006.01) | |
| B01D 39/20 | (2006.01) | |
| B01D 46/10 | (2006.01) | |
| B82Y 30/00 | (2011.01) | |
| B01D 46/00 | (2006.01) | |
| B01D 46/24 | (2006.01) | |

(52) U.S. Cl.
CPC ............ *B01D 39/2068* (2013.01); *B01D 46/10* (2013.01); *B82Y 30/00* (2013.01); *B01D 46/008* (2013.01); *B01D 46/2411* (2013.01); *B01D 2239/025* (2013.01); *B01D 2239/0654* (2013.01); *B01D 2239/069* (2013.01)

USPC .................. 55/506; 55/486; 55/487; 55/497; 55/521; 55/524; 96/54; 96/134; 96/135; 96/153

(58) Field of Classification Search
CPC .......... B01D 2275/10; B01D 39/1623; B01D 46/10; B01D 25/001
USPC .......... 55/524, 527, 486–487, 497, 506, 512, 55/521; 96/54, 134, 135, 153; 210/203, 210/295, 323.1, 323.2, 348, 489, 490–491, 210/493.5, 503–506
See application file for complete search history.

(56) References Cited

U.S. PATENT DOCUMENTS

| | | |
|---|---|---|
| 5,938,823 A | 8/1999 | Condit et al. |
| 6,787,104 B1 | 9/2004 | Mariella, Jr. |
| 7,655,070 B1 * | 2/2010 | Dallas et al. ................... 95/154 |
| 2008/0110342 A1 * | 5/2008 | Ensor et al. ...................... 96/54 |

* cited by examiner

*Primary Examiner* — Robert Clemente
*Assistant Examiner* — Karla Hawkins
(74) *Attorney, Agent, or Firm* — Eddie E. Scott

(57) ABSTRACT

An air filter replacement system for existing buildings, vehicles, arenas, and other enclosed airspaces includes a replacement air filter for replacing a standard air filter. The replacement air filter has dimensions and air flow specifications that allow it to replace the standard air filter. The replacement air filter includes a filter material that removes radiological or biological or aerosol particles.

20 Claims, 7 Drawing Sheets

RADIOLOGICAL/BIOLOGICAL/AEROSOL REMOVAL SYSTEM

CROSS-REFERENCE TO RELATED APPLICATIONS

This application claims benefit under 35 U.S.C. §119(e) of U.S. Provisional Patent Application No. 61/535,285 filed Sep. 15, 2011 entitled "Method and Fabrication of a Radiological/Biological/Aerosol Removal Device," the disclosure of which is hereby incorporated by reference in its entirety for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

1. Field of Endeavor

The present invention relates to protection of buildings and places and more particularly to protection of ventilation systems in places or buildings or vehicles.

2. State of Technology

High Efficiency Particulate Air (HEPA) filters are widely used commercial products. They "were originally developed as the particulate stage of a chemical, biological, radiological filtration/adsorber unit. In the late 1940s, the U.S. Atomic Energy Commission adopted them for use for the containment of airborne radioactive particulates in the exhaust ventilation systems of experimental reactors as well as for use in other phases of nuclear research. The period from the mid 1950s to the present has seen the emergence of many new industrial and scientific technologies requiring particulate free air in order to produce more sensitive products such as microelectronic components, photoproducts, drugs and dairy products. These technologies fostered the development of a wide range of specialized devices to house HEPA filters (and other types of similar filters) to deliver clean air to production areas. Uses for HEPA filters in hazardous containment applications have increased also, and they are more routinely used on the exhaust side of bio-hazard hoods, animal disease research laboratories and whenever airborne carcinogens must be controlled."

Existing HEPA filters are made from glass and polymer fiber along with polymer binders, which are fragile and easily damaged due to effects of chemicals, high pressures and temperatures. A ceramic HEPA filter technology would overcome these problems and potentially would allow the filter to be cleaned and reused, thereby reducing secondary waste. The ceramic HEPA filter technology would be designed to minimize retrofit problems and costs while meeting several key HEPA filter requirements.

U.S. Pat. No. 6,787,104 to Raymond P. Mariella, Jr., assigned to The Regents of the University of California, filed Sep. 14, 2000, and issued Sep. 7, 2004 provides the following state of technology information.

"Biological agent weapons have been around at least since the Middle Ages when soldiers are reported to have catapulted the bodies of dead smallpox or plague victims over fortress walls in the hope of infecting their enemies or at least demoralizing them. Today, biological weapons (BW) are appearing in the news with increasing frequency. The anthrax threat in Las Vegas in February 1998 is an example. Surplus stores in Las Vegas sold out of gas masks, and talk-radio shows were swamped with callers asking about evacuation points. That threat turned out to be a false alarm, but the next one might be real. The Aum Shinrikyo cult grew and released anthrax spores in Tokyo, but, fortunately they did not have and effective means of dispersal of the spores and no deaths were reported. In Sverdlovisk, Union of Soviet Socialistic Republics in 1979 a quantity of dry anthrax spores were accidentally released from a military facility, killing 67 people downwind."

"Biological agents are of concern in part because of the ease with which many of them can be manufactured, transported, and dispensed. Because of the lag time between a biological attack and the appearance of symptoms in those exposed, biological weapons could be devastating. Many biological agents are contagious; and during this lag time, infected persons could continue to spread the disease, further increasing its reach. Hundreds or even thousands of people could become sick or die if a biological attack were to occur in a major metropolitan area."

"A historical example illustrates the scale of the effort required to respond to an act of BW terror in a major metropolitan area. In 1947, an American businessman traveled to New York City from Mexico City. During his bus ride, he developed a fever, headache, and rash. Though ill upon his arrival in New York, he went sightseeing. Over a period of several hours, he walked around the city and through a major department store. His illness, smallpox, progressed and he died nine days later. As a result of this single case, other cases of smallpox and two deaths occurred. Because of smallpox's ability to be transmitted from person to person, this handful of cases was deemed so serious by public health officials that 6,350,000 persons in New York City alone were vaccinated in less than a month."

"In view of the foregoing, there is an increasing need for a system for detecting and eliminating biological and chemical agents. The system could be installed in a building or other area with an enclosed airspace. For example the system could be installed in subways, airports, entertainment centers, religious centers, office complexes, convention centers, and other sites where the public is at high risk of exposure to a covert release of biological or chemical agents. The system could also be part of a network of systems installed in urban areas or large events such as inaugurations or the Olympics."

"The majority of detection and identification systems that are currently commercially available generally require a laboratory setting for testing and are designed for one positive detection only (Military System). There is also the question "what would be recommended as an action, if a real pathogen were detected?" Most people do not have a HEPA-filtered mask available. Even if a HEPA-filtered mask were available, it would likely not be properly fitted; and the individual would likely not be properly trained for its use."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a system for the removal of biological and radiological aerosol particles utilizing innovative nanofibers and a process for producing same upon a desirable substrate or in free-form as an air filter. The present invention also provides a high surface area media for catalysis and catalysis reactions or function as a catalyst material itself. This filter has desirable characteristics in potentially low pressure drop with high filtration efficiency, low cost, and in place regeneration. All these features and others make it suitable for retrofitting into existing air handling equipment without deleterious pressure drop (flow starvation) or flammability and fire code issues.

The present invention provides a replacement air filter that is a "like in kind" replacement for a prior art standard air filter. The replacement air filter of the present invention has the standard dimensions of the prior art standard air filter and the replacement air filter of the present invention has the air flow specifications of the prior art standard air filter. The replacement air filter of the present invention includes a filter material that removes radiological or biological or aerosol particles. The replacement air filter of the present invention may utilize nanofibers to improve filtration efficiency with low pressure drop in the air flow.

The manufacturing is aided by an electrospinning type process and innovative selection of fiber material precursors that can yield particularly fine fiber dimension in the nanometer and micrometer scale after processing. It is anticipated that these properties would be desirable for installation in critical buildings, low air particle facilities and air handling system for public places. It may also have applications in homes and related consumer uses. In an innovative fashion the fiber mat would be used as a substrate for gas and/or liquid phase processing where catalysts or other immobile agents are needed. These catalysis or immobilization agents may provide visible signals of the presence of a contaminant, agent, or actively facilitate the mitigation of the effects of agent or contaminant for instance in flowing air. Alternatively it may provide a substrate for reactions requiring high surface area.

The filter system provides an air filter replacement system for existing buildings, vehicles, arenas, and other enclosed airspaces. In one embodiment, the present invention provides a system for removal of radiological or biological or aerosol particles from within air inside of an enclosed airspace that is a gathering area for people, wherein the airspace has an air flow system with a standard air filter of predetermined dimensions and air flow specifications. The system for removal of radiological or biological or aerosol particles from within air inside of an enclosed airspace includes a replacement air filter for replacing the standard air filter. The replacement air filter has dimensions and air flow specifications that allow it to replace the standard air filter. The filter material in the replacement air filter removes the radiological or biological or aerosol particles.

The filter system of the present invention and its use in an overall gas stream system can be used in military, nuclear, bio-tech (including pharmaceutical), chemical (including powder, wet-chemistry, and semi-conductor industries) systems, and power (e.g., coal). These systems may be ventilation systems (e.g., glove box, hot cell, fume hood, room exhaust, facility exhaust, or inlet) or process systems or test systems (e.g., for R&D purposes). This may include DOE, NNSA, NRC, DOD, NASA, FDA, and other facilities. The filter apparatus and its use in an overall gas stream system can be used in existing or new military, nuclear, bio-tech, semiconductor fabrication, and/or chemical systems. They may be installed as part of new systems or retrofits of existing systems. Such facilities may include nuclear reactors, nuclear fuel processing, nuclear fuel testing, nuclear fuel storage, radioactive material processing, hazardous material processing (e.g., Be). The present invention has use in process environments such as fume hoods, semi-conductor processing, pharmaceutical processing and similar applications.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Figure 1:
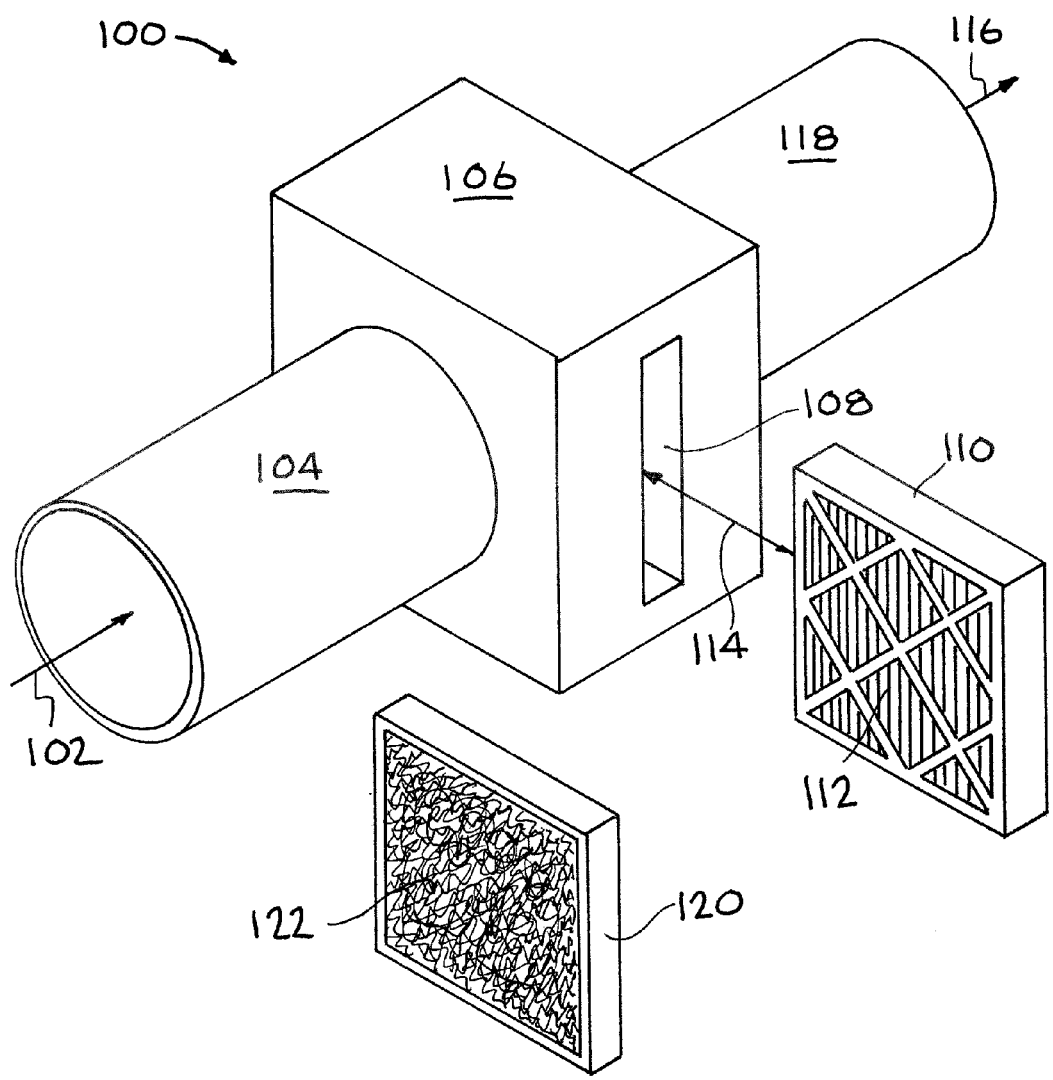
FIG. 1 illustrates one embodiment of an air filter replacement system of the present invention wherein an existing prior art air filter is replaced with an improved replacement air filter that removes radiological or biological or aerosol particles.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

The anthrax contamination of the Hart Senate office building and U.S. postal facilities provide examples of the risks of the unimpeded spread of biological aerosols as well as the high cost to clean up contamination. Clean-up costs of more than 14 million dollars were incurred in the case of the Hart Senate office building. Present air filtration systems in most buildings are incapable of preventing the rapid spread of aerosols less than several microns (bacteria—nominally 1 to 10 micrometers, viruses—mostly between ~20 and 300 nanometers). Consequently air filtration has been identified as a critical need to defend against terrorist attacks. HEPA (High-efficiency Particulate Arrester or High-efficiency Particulate Air) filters can remove these aerosols but they produce a large pressure drop in the air flow. Similar filters are also used in personnel respirators to protect individuals from exposure. The pressure drop through respirators with HEPA filters can produce a noticeable strain on users during extended use.

Empirical experimental evidence supported by theory suggests that continuous nanofibers can be used to achieve high aerosol removal efficiency with a very low pressure drop across the filter. In most conventional ventilation systems (in buildings, homes, etc.) low pressure drop filters are needed to prevent choking off the air flow. Less resistance to a person's normal breathing is also desirable for personnel respirator filters that remove aerosol particles. A novel inorganic nanofiber material processing method using electro-spinning techniques (i.e. using high voltage to draw nanometer diameter fibers from the meniscus of a liquid solution) can be used to produce an inorganic nanofiber filter medium. These inorganic fibers can be a nonflammable and chemical resistant filter material. The filters can also be used to collect aerosols for identification.

The present invention addresses the technical problem of obtaining HEPA quality filtering of air in existing buildings utilizing existing building ventilation systems. The challenge for using traditional HEPA filters for this application is that the pressure drop across the filter is so large for existing ventilation systems such that it will stop nearly all air flow through the system. Even with a blower replacement some modification of the ductwork will be required to handle the increased pressure on the system.

Traditional HEPA filters are composed of a mat of randomly arranged fibers. The fibers in a filter are typically composed of fiberglass and potentially polymer fiber along with polymer binders. The fiber diameters are often between 0.5 and 2.0 micrometers. The filter performance is affected by particularly fiber diameter, filter thickness, and face velocity. Unlike membrane filters, where particles as wide as the largest opening or distance between pores cannot pass through the membrane, HEPA filters primarily filter smaller pollutants and particles by several mechanisms. As described in the literature, these particles are trapped (they stick to a fiber) through a combination of three mechanisms: (1) Interception, where particles following a line of flow in the air stream come within one particle radius of a fiber and adhere to it. (2) Impaction, where larger particles are unable to avoid fibers by following the curving contours of the air stream and embed in one of the fibers directly; this effect increases with diminishing fiber separation and higher air flow velocity. (3) Diffusion, a mechanism that is a result of the collision with gas molecules by the particles below 0.1 µm in diameter, which eventually causes a particle to hit a fiber. The diffusion behavior can be compared to Brownian motion of molecules and raises the probability that a particle will be stopped by either of the other two mechanisms.

Diffusion predominates below the 0.1 µm diameter particle size. Impaction and interception predominate above 0.4 µm. In between, near the Most Penetrating Particle Size (MPPS) 0.3 µm, both diffusion and interception are comparatively inefficient. Because this size has the lowest removal efficiency, HEPA specifications for efficiency are made for standard particles of this size.

Referring now to the drawings and in particular to FIG. 1, one embodiment of a filter system of the present invention is illustrated. The filter system is designated generally by the reference numeral 100. The filter system 100 provides protection from biological and radiological aerosol attack. The filter system 100 is air filter replacement system wherein an existing prior art air filter is replaced with an improved replacement air filter that removes radiological or biological or aerosol particles.

The filter system 100 provides an air filter replacement system for existing buildings, vehicles, arenas, and other enclosed airspaces. As illustrated in FIG. 1, the existing air ducts 104 and 118 are part of a building's, vehicle's, arenas' or other enclosed air space's air circulation system. The air ducts 102 and 116 are connected to a plenum 106 having an opening 108 for replacing the prior art air filter 110. The arrows 102 and 116 illustrate the air flow through the air duct 104, the plenum 106, the air filter, and the air duct 118.

The prior art air filter 110 is a standard air filter used in building's, vehicle's, arenas' or other enclosed air space's air circulation system. As illustrated the prior art air filter 110 has filter media 112 of material such as glass fibers to remove contaminants such as dust, mold, and particles from the air as the air passes through the filter media 112. The prior art air filter 110 with the filter media 112 is limited in the size of the particles it can remove. The prior art air filter 110 has standard dimensions and air flow specifications. Because of the limitations created by the standard dimensions of the prior art air filter 110 the prior art air filter 110 with the filter media 112 is not a High-Efficiency Particulate Air or HEPA air filter. A HEPA air filter would be far too large to be used to replace the prior art air filter 110 which is restricted to standard dimensions and air flow specifications.

The replacement air filter 120 that has filter material 122 that removes the radiological or biological or aerosol particles. The replacement of the prior art air filter 110 with the replacement air filter 120 is represented by the double headed arrow 114. The opening 108 allows the replacement of the prior art air filter 110 with the replacement air filter 120 having a filter material 122 that removes the radiological or biological or aerosol particles. The replacement air filter 120 provides a "like in kind" replacement for the prior art standard air filter 110. The replacement air filter 120 has the standard dimensions of the prior art standard air filter 110 and the replacement air filter 120 has the air flow specifications of the prior art standard air filter 110. The opening 108 generally has a door or removable panel that provides access to the opening 108.

The filter system 100 provides protection of any enclosed airspace that is a gathering area for people. The filter system 100 has use in buildings, vehicles, arenas, and other enclosed airspaces that are a gathering area for people. The filter system 100 provides an air filter replacement system for existing buildings, vehicles, arenas, and other enclosed airspaces. The air filter replacement system of the present invention provides replacing the existing prior art air filter 110 with a replacement air filter 120 that removes radiological or biological or aerosol particles. The replacement air filter 120 of the present invention has the same dimensions and air flow specifications as the prior art air filter 110 and the replacement air filter 120 of the present invention has a filter material 122 that removes the radiological or biological or aerosol particles.

The replacement air filter 120 is a replacement air filter for replacing a standard air filter. The replacement air filter 120 has dimensions and air flow specifications that allow it to replace the standard air filter. The replacement air filter 120 has a filter material that removes the radiological or biological or aerosol particles. In one embodiment the replacement air filter 120 has a filter material that are nanofibers. In one embodiment the replacement air filter 120 has a filter material that are ceramic nanofibers. In one embodiment the replacement air filter 120 has a filter material that are nanofibers with a diameter that is within the range of one nanometer to two hundred nanometers. In one embodiment the replacement air filter 120 has a filter material that are nanofibers with a diameter that is within the range of five nanometers to two hundred nanometers. In one embodiment the replacement air filter 120 has a filter material that are nanofibers with a diameter that is within the range of five nanometers to two hundred nanometers and wherein some of said nanofibers in said filtering material have a diameter that is larger than two hundred nanometers.

The Defense Advanced Research Projects Agency (DARPA) had a safe-building initiative in connection with DHS. Nanofibers particularly may be produced as glasses or inorganic oxide materials or other related inorganic compounds. Other uses of the filter system 100 include semiconductor fabrication, clean rooms, aerospace manufacturing, petroleum processing, botech/biopharmaceutical, pharmaceutical manufacturing, clean coal power generation, hazardous chemicals processing, mining, metals processing, wastewater treatment, agriculture, dyes, defense industries, nuclear power generation, non-reactor nuclear facilities, ceramic filters to replace existing filters for use in storage and shipping containers, ceramic filters to replace existing filters for inline process filters, ceramic filters for chemically hostile environments, clean rooms, automotive, and other uses. Some of the benefits achieved by the filter system 100 include: survive elevated temperature, moisture, corrosion and fires better than existing technology; increase safety of operations—by performing the safety function within a wider operational range; provide for in-situ cleaning and reuse, thereby reducing secondary waste; minimize costs and risks of contamination posed by "hot breaks;" nuclear, pharmaceutical, and chemical industries utilizing gloveboxes would greatly benefit from a nonflammable, corrosion resistant "housekeeping" filter; specialty applications such as fume hoods that are used in numerous commercial industries, as well as research laboratories, involving dangerous particulates and/or corrosive agents could be significantly improved by a ceramic HEPA filter with performance characteristics exceeding that of traditional, non-ceramic, HEPA filters; and other benefits.

The filter system of the present invention and its use in an overall gas stream system can be used in military, nuclear, bio-tech (including pharmaceutical), chemical (including powder, wet-chemistry, and semi-conductor industries) systems, and power (e.g., coal). These systems may be ventilation systems (e.g., glove box, hot cell, fume hood, room exhaust, facility exhaust, or inlet) or process systems or test systems (e.g., for R&D purposes). This may include DOE, NNSA, NRC, DOD, NASA, FDA, and other facilities. The filter apparatus and its use in an overall gas stream system can be used in existing or new military, nuclear, bio-tech, semiconductor fabrication, and/or chemical systems. They may be installed as part of new systems or retrofits of existing systems. Such facilities may include nuclear reactors, nuclear fuel processing, nuclear fuel testing, nuclear fuel storage, radioactive material processing, hazardous material processing (e.g., Be).

The filter system 100 provides a system for the removal of biological and radiological aerosol particles utilizing innovative nanofibers and a process for producing same upon a desirable substrate or in free-form as an air filter. The present invention also provides a high surface area substrate for catalysis and catalysis reactions or may function as a catalyst material itself. This filter has desirable characteristics in potentially low pressure drop with high filtration efficiency, low cost, and in place regeneration. All these features and others make it suitable for retrofitting into existing air handling equipment without deleterious pressure drop (flow starvation) or flammability and fire code issues. The manufacturing is aided by an electrospinning type process and innovative selection of fiber material precursors that can yield particularly fine fiber dimension in the nanometer and micrometer scale after processing. It is anticipated that these properties would be desirable for installation in critical buildings, low air particle facilities and air handling system for public places. It may also have applications in homes and related consumer uses. In an innovative fashion the fiber mat would be used as a substrate for gas and/or liquid phase processing where catalysts or other immobile agents are needed. Alternatively it may provide a substrate for reactions requiring high surface area.

In a terrorist attack, aerosolized chemical particles (including liquid sols), radiological particles or biological pathogens might be dispersed through release of the agents through sprays into an enclosed airspace. There are concerns about environmental safety and medical safety inside an enclosed airspace that are solved by the present invention. Conceptually, the safety of the occupants of a building could be assured by installing a system, such as that described in the Condit et al patent, within the air circulation system of a building. The system would be operated upon detection of a dangerous chemical or biological agent. U.S. Pat. No. 5,938,823, to David A. Condit, Timothy N. Obee, Willard H. Sutton, Richard R. Grzybowski, Christopher M. Pater, Antonio Rinaldi, Sunita Satyapal, Wayde R. Schmidt, Charles R. Winston, and Michael Winter, assigned to Carrier Corporation, filed Apr. 18, 1997, and issued Aug. 17, 1999, is incorporated herein by reference.

The vast majority of buildings need not resort to such an expensive, maintenance-intensive approach, since most buildings will never be the target of a biological warfare (BW) agent attack. The present invention minimizes the maintenance burden to a building. That is, the existing air circulation system would operate essentially unchanged once the new system is installed, except that the new system 100 provides a replacement air filter 120 that has filter material 122 that removes the radiological or biological or aerosol particles. Absent this difference, the annual maintenance burden would be only slightly increased.

The public health consequences of a release of biological, radiological, and/or chemical agents could be overwhelming. If kilograms of an agent like anthrax were disseminated in New York City today, conservative estimates put the number deaths occurring in the first few days at 400,000. Thousands of others would be at risk of dying within several days if proper antibiotics and vaccination were not started immediately. Millions of others would be fearful of being exposed and seek or demand medical care as well. Beyond the immediate health implications of such an act, the potential panic and civil unrest created would require an equally large response. Local law enforcement agencies would be overwhelmed and would need the assistance of state and federal agencies. The complete vulnerability of public areas such as subways, airports, entertainment centers, religious centers, office complexes, convention centers to this type of terrorism would prompt other terrorists to attempt the same type of attack for extortion or additional terror impact.

Fallout from a nuclear or radiological attack, could be dealt with to some degree if buildings possessed a system such as described and claimed in this patent application. Similarly, if people were told to stay inside a building while the cloud of biological warfare (BW) agent dispersed the occupants of the building could be protected against the BW by the filters.

In addition, the problem of biological warfare cannot be narrowly focused on its ability to kill or render people ill. Biological warfare's potential to create significant economic loss and subsequent political instability with plausible denial exceeds any other known weapon. Germ warfare at the end of the twentieth and inception of the twenty-first century directly threatens the security of the United States and the achievement of a peaceful, prosperous, and stable post-cold war era.

Figure 2:
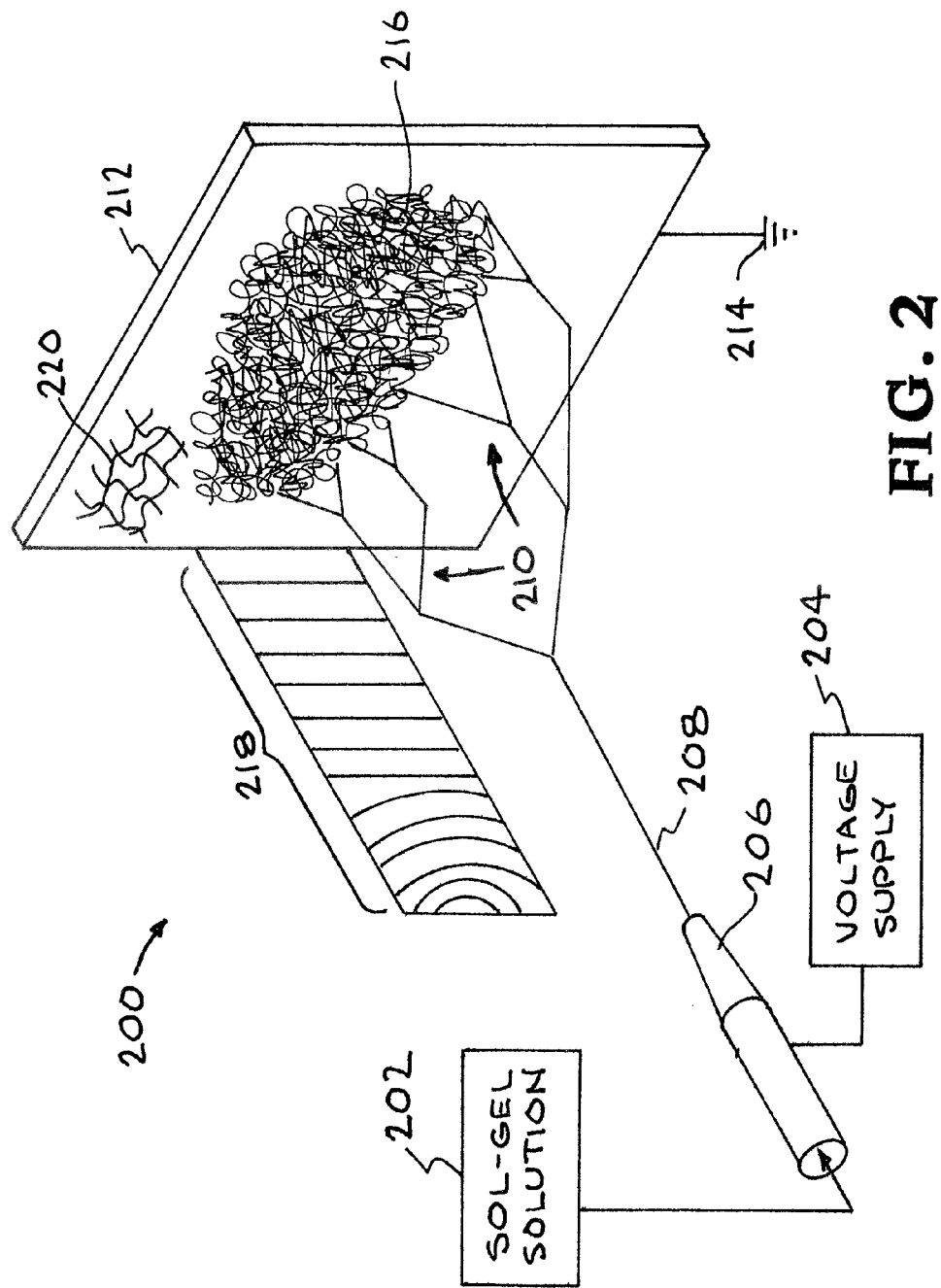
FIG. 2 illustrates one embodiment of an electrospinning system for producing an improved air filter.

Referring now to FIG. 2, one embodiment of an electrospinning system for producing an improved air filter is illustrated. The system is designated generally by the reference numeral 200. The electrospinning system 200 uses electrospinning technology to form a mat 216 of nano-fibers. A supply of sol-gel solution for nano-fibers 202 is fed to an electrospinning unit having a nozzle 206 where the sol-gel solution of nano-fibers is ejected as a jet 208. A voltage source 204 provides a voltage supply to the electrospinning unit. The jet of sol-gel solution 208 is directed toward a conductive collector 212. The conductive collector 212 acts as an electrically conductive collector through appropriate electrical connections 214. The voltage source 204 and the electrical connections 214 create a constant electrical potential between the nozzle 206 and the conductive collector 212. Alternatively, the conductive collector 212 may be a porous substrate with a conductive collector placed beneath the porous substrate. The porous substrate may advantageously be used as a support structure for the nanofiber filtration media produced by electrospinning. An illustration of the nominal electric field is shown in 218 by way of illustration. This field may be modified by techniques known to those knowledgeable in the art of electrospinning. As the jet 208 enters the electrical field 218 it splays out (spinning) and is deposited on the conductive collector 212. The splaying is illustrated at 210. Alternatively, it is known that splaying may not always be present. Also splaying of the fiber is not necessarily required in the creation of suitable nanofibers for this apparatus. The mat 216 of nano-fiber material is produced on the conductive collector 212.

The sol-gel solution may be composed of various nominally linear long chain polymers in a solvent solution. Examples of these polymers could include polyethylene oxide and polyvinyl alcohol among others. The molecular weight of these long chain polymers is often in the range of 50,000 to 2,000,000 grams/mole, but may sometimes be utilized from an even larger range such as 20,000 to 8,000,000 grams/mole. This solution may be used to produce polymer nanofibers. A particularly beneficial example of a sol-gel solution that may be utilized is a solution that incorporates an inorganic precursor component. In another particularly beneficial example of use of this inventions the inorganic precursor solution is mixed in various proportions with the long chain polymers described earlier. A beneficial aspect of this example is that with thermal decomposition of the polymer phase, the resulting nanofibers can be obtained with even smaller diameters. The smaller diameter results in even lower pressure drop in the filter media which is desirable in producing a filter that can be used in an existing ventilation system as illustrated in FIG. 1.

By various methods it can be possible to produce either crystalline ceramic nanofibers with appropriate heat treatments or to retain an amorphous nanofiber. The approaches for sol-gel component selection and thermal treatments to select various oxide ceramic, non-oxide ceramic, and amorphous nanofibers will be apparent to those knowledgeable in the art of inorganic materials processing and fabrication. Various mixed oxides will also be possible with mixtures of sol-gel solutions containing different types of inorganic material precussors. Additionally, in some examples metal nanofibers may be created with a proper reducing atmosphere as an added material processing step after electrospinning the nanofibers.

Figure 3:
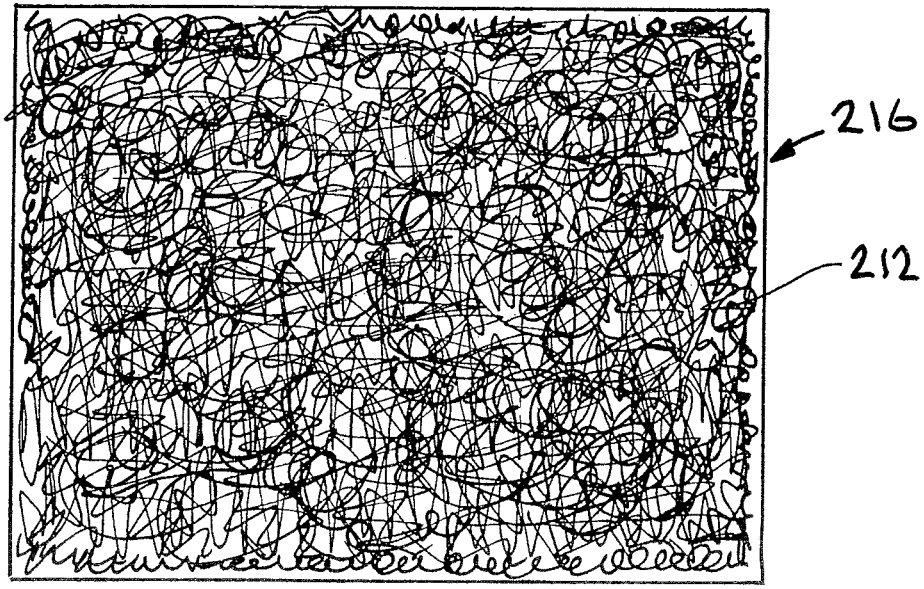
FIG. 3 shows a mat of nano-fiber material in greater detail.

The mat 216 of nano-fiber material is shown in greater detail in FIG. 3. The conductive collector or porous substrate 212 that forms the base for the filter. The mat 216 of nano-fiber material on the conductive collector or substrate 212 provides the filter material that removes the radiological or biological or aerosol particles. In one embodiment the mat 216 of nano-fiber material on the conductive collector 212 is made of ceramic nanofibers that are selected for high porosity to provide low pressure drop and low weight. The nanofibers that form the mat 216 improve the filtration efficiency of the ceramic element/substrate as well as the possible contribution to the filtration efficiency by the coatings made using the mat 216.

Figure 4:
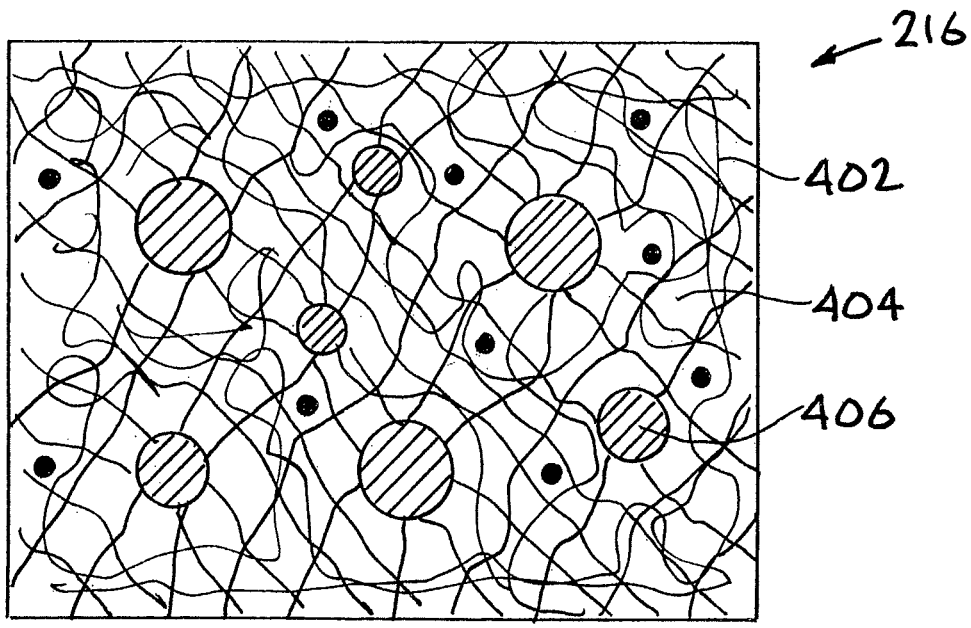
FIGS. 4A and 4B show additional details of the mat of nano-fiber shown in FIG. 3.
Figure 4B:
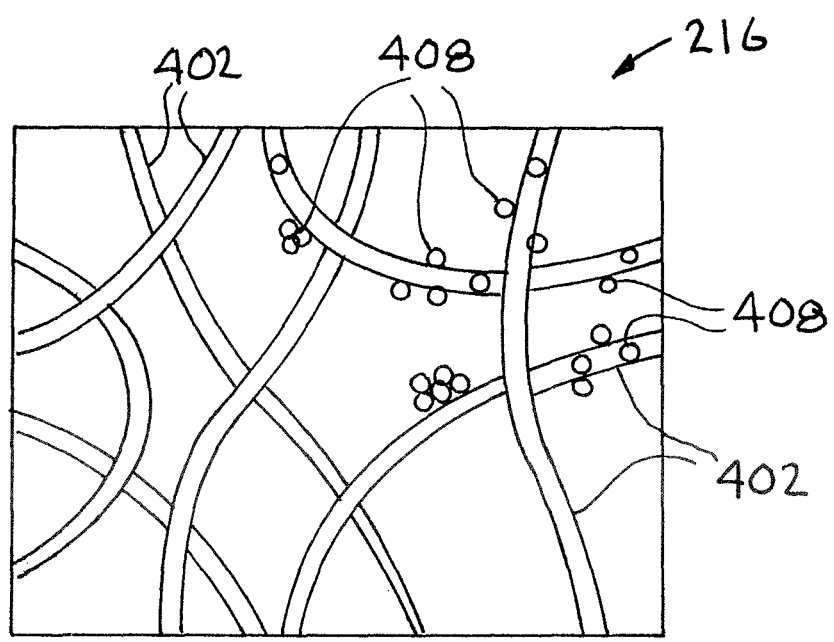
Figure 5A:
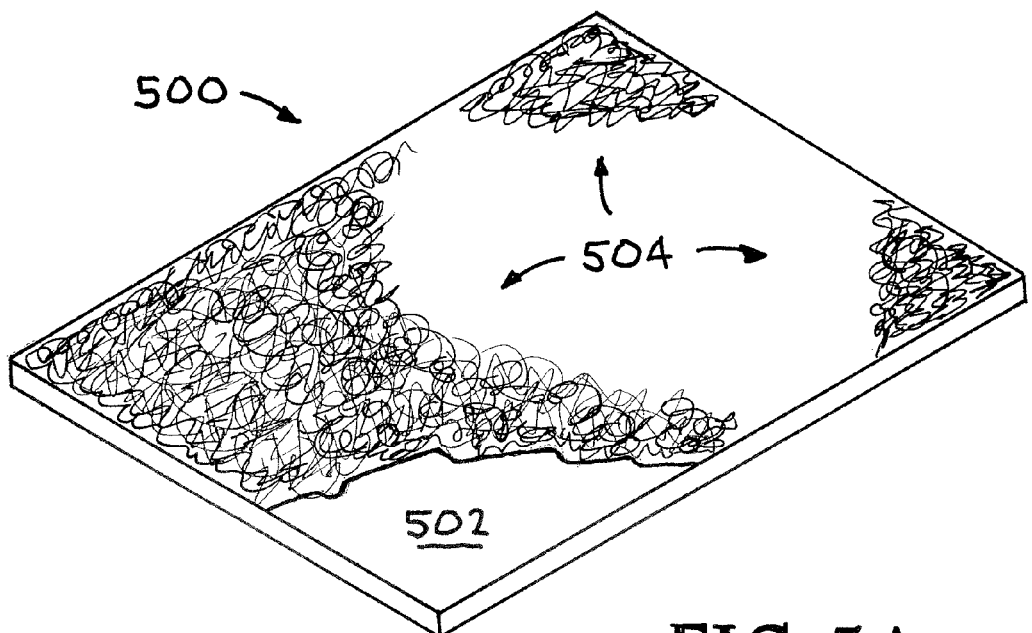
FIGS. 5A and 5B show embodiments of the filter material in a filter unit of the present invention.
Figure 5B:
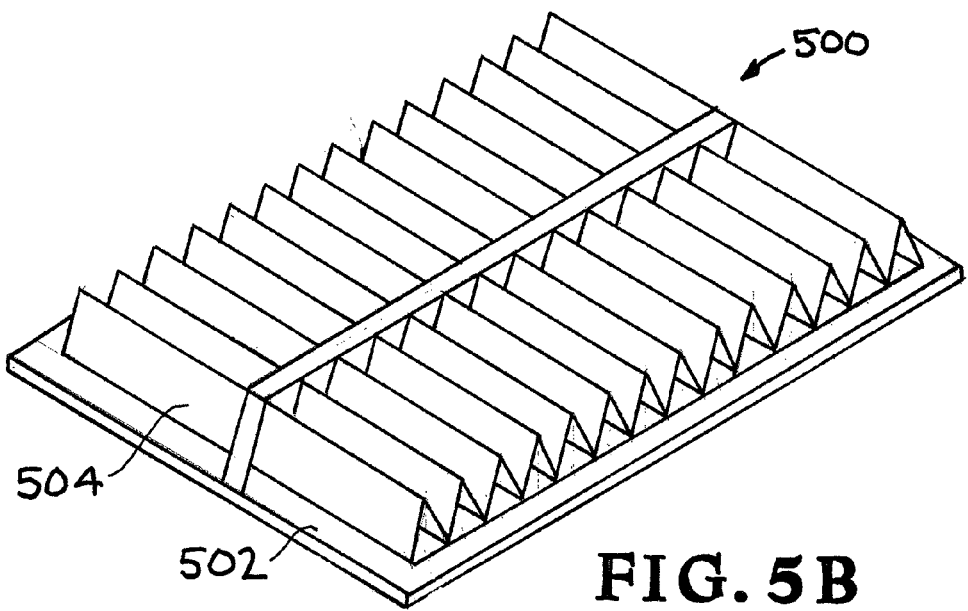

Additional details of the mat 216 of nano-fiber are shown in FIGS. 4A and 4B. An enlarged portion of the mat 216 of nano-fiber of FIG. 3 is shown in FIG. 4A. The mat 216 is made of individual fibers 402. The individual fibers 402 provide a fine web that has open areas 404 made up of the three dimensional web of fibers 402. Large particles 406 being filtered become trapped in contact with the fibers 402. In one embodiment the mat 216 has a filter material that are ceramic nanofibers. In one embodiment the mat 216 has a filter material that are nanofibers with a diameter that is within the range of one nanometer to two hundred nanometers. In one embodiment the mat 216 has a filter material that are nanofibers with a diameter that is within the range of five nanometers to two hundred nanometers. In one embodiment the mat 216 has a filter material that are nanofibers with a diameter that is within the range of five nanometers to two hundred nanometers and wherein some of said nanofibers in said filtering material have a diameter that is larger than two hundred nanometers.

An enlarged portion of the mat 216 of nano-fiber of FIG. 4A is shown in FIG. 4B. The mat 216 is made of individual fibers 402. The individual fibers 402 provide a fine web. The particles 408 that are smaller than the particles 406 shown in FIG. 3 become trapped through contact with the fibers 402. The filter produced by the mat 216 of nano-fiber material has many advantages over prior art filters. These advantages include providing a filter having an efficiency of 99.97% for 0.3 micron DOP particles while producing low pressure drop preferably less than 4 inches of water column and more particularly preferable at less than 1 inch of water column.

The present invention involves the use of electrospinning techniques utilizing mainly dilute but possibly concentrated solutions of inorganic precursors combined with appropriate polymer precursors to produce inorganic, nominally continuous nanofibers in a filter type form. Particularly the invention deals with the use of these nanofibers to form an inorganic, non-flammable filtration medium to remove sub-micron particles (particularly particles to 0.3 micrometers), typical of HEPA (High-efficiency Particulate Arrester or High-efficiency Particulate Air) filters. By reducing the inorganic precursor fraction to low levels along with other electrospinning process parameters the diameter of the nanofibers can be reduced. Some fraction of a long chain polymer molecule solution is usually needed to maintain continuous nanofibers during electrospinning. A soluble long chain polymer for example polyvinylalcohol can often be used for this purpose.

Variation of the fraction of the long chain polymer to the amount of inorganic precursor material can affect the resulting nanofibers. In particular narrower fibers may be available from solutions that were less concentrated in the inorganic precursor. The precursor materials can be converted to inorganic nanofibers by low temperature heat treatment in a selected environment. A adequate amount of gelation of the inorganic precursor material in the solution may be required to retain sufficient continuous inorganic nanofibers. Depending on selection of precursor materials (and thereby the subsequent nanofiber material) the resulting nanofibers may be either glass phase or crystalline phase fibers. Typically fibers may be obtained as oxide materials by heat treatment in air or oxygen but other materials may be possible such as silicon nitride or silicon carbide by treatment in an appropriate atmosphere (nitrogen, reducing atmospheres, or otherwise).

A particular advantage of this approach is non-flammable filter media which may meet fire code requirements or mitigate concerns about combustion. Also performance may be maintained to higher temperatures. Nanofibers have the potential advantage of obtaining very high particle removal efficiency with very low pressure drop. This would allow retrofitting of existing ventilation systems without requiring replacement of blowers and ducting to tolerate higher pressures that are produced with current HEPA filter systems. The protection by filters against biological or radiological materials may be distributed throughout a building so that no single point of failure (or defeat) can allow for extensive contamination of an entire building.

Another potential use for this invention would be use of the nanofiber media as a substrate material with high surface area for gas phase or liquid phase reaction (chemical processes). This may provide for relatively low cost fabrication technique for continuous oxide nanofiber materials and non-oxides under specific conditions. Whisker nanofibers of the same materials may be fabricated by subsequent milling operations. The benefits of this applications would include for example reactions with visual or other indicator compounds within the nanofibers or intentionally absorbed to the nanofibers that could allow for visual or similar indications of the presence of a particular agent. This might be through visual inspection of the filter media or through the production of safe but visible particles or vapor produced by the reaction.

Potential application for unique optical, electrical, magnetic properties of nanofiber either resulting from composition or compound used to form the nanofiber or from the nominally one dimensional structure of the nanofibers created. These may include piezoelectric, thermoelectric, ferroelectric, magnetostrictive, optical or related properties and also potentially effects upon band gap properties. Particular benefit may occur from the ease of fabrication of materials with small diameter fiber morphology from this invention.

Large scale production of a media of the nanofibers may be obtained by concurrent electrospinning of the nanofibers from multiple spinning nozzles. This may require careful control of nozzle to collection electrode distance or robust control of current from each nozzle. Controlling circuitry (active or passive) may be beneficial in this regard for high volume or high nominal projected area production of nanofiber media. Alternatively the nozzle may be translated across the conductive collector or substrate to effect a uniform deposition of nanofibers. Further adaptations of the precursor solution for robust process control may be employed to facilitate electro-spinning from multiple nozzles.

Referring now to FIGS. 5A and 5B, embodiments of the filter material are shown in a filter unit of the present invention. The filter unit is designated generally by the reference numeral 500. The filter unit 500 includes a filter unit body 502. Filter media 504 is contained in the filter unit body 502. In FIG. 5A the filter media 504 is a mat of nano-fiber material on the filter unit body 502 that provides the filter material that removes the radiological or biological or aerosol particles. In one embodiment the mat of nano-fibers is made of ceramic nanofibers that are selected for high porosity to provide low pressure drop and low weight. The mat of nano-fibers improve the filtration efficiency of the ceramic element/substrate as well as the possible contribution to the filtration efficiency by the coatings made using the mat 504.

In FIG. 5B the filter media 504 is a pleated mat of nano-fiber material on the filter unit body 502 that provides the filter material that removes the radiological or biological or aerosol particles. In one embodiment the pleated mat of nano-fiber material is made of ceramic nanofibers that are selected for high porosity to provide low pressure drop and low weight. The pleated mat of nano-fiber material improve the filtration efficiency of the ceramic element/substrate as well as the possible contribution to the filtration efficiency by the coatings made using the mat 504.

Referring now to FIG. 6, another embodiment of a filter system of the present invention is illustrated. The filter system is designated generally by the reference numeral 600. The filter system 600 provides protection from biological and radiological aerosol attack. The filter system 600 is an air filter replacement system wherein an existing prior art air filter is supplemented by an improved replacement air filter that removes radiological or biological or aerosol particles and a prior art air filter acts as a pre-filter. The air filter replacement system is designated generally by the reference numeral 612.

The filter system 600 provides an air filter replacement system for existing buildings, vehicles, arenas, and other enclosed airspaces. As illustrated in FIG. 6, the existing air ducts 604 and 608 are part of a building's, vehicle's, arenas' or other enclosed air space's air circulation system. The arrows 602 and 610 illustrate the air flow through the air duct 604, the plenum 606, the air filters, and the air duct 608. The air ducts 604 and 608 are connected to a plenum 606 having openings 614*a* and 614*b* for the air filters.

An improved replacement air filter 618 that removes radiological or biological or aerosol particles is used with a prior art air filter 622 and the prior art air filter 622 acts as a pre-filter for the improved replacement air filter 618. The prior art air filter 622 is a standard air filter that has filter media of material such as glass fibers to remove contaminants such as dust, mold, and particles from the air as the air passes through the prior art air filter 622.

The replacement air filter 618 that has filter material that removes the radiological or biological or aerosol particles. The insertion of the prior art air filter 622 into the plenum 606 is represented by the double headed arrow 620. The insertion of the improved replacement air filter 618 into the plenum 606 is represented by the double headed arrow 616. The beneficial value of small pressure drop from the improved replacement filter 618 is apparent in causing minimal reduction in air flow through the existing air handling system including the ducts 604 and 608 and plenum 606.

The filter system 600 provides protection of any enclosed airspace that is a gathering area for people. The filter system 600 has use in buildings, vehicles, arenas, and other enclosed airspaces that are a gathering area for people. The filter system 600 provides an air filter replacement system for existing buildings, vehicles, arenas, and other enclosed airspaces. The replacement air filter 618 has a filter material that removes the radiological or biological or aerosol particles. In one embodiment the replacement air filter 618 has filter materials that are nanofibers. In one embodiment the replacement air filter 618 has a filter material that are ceramic nanofibers. In one embodiment the replacement air filter 618 has a filter material that are nanofibers with a diameter that is within the range of one nanometer to two hundred nanometers. In one embodiment the replacement air filter 618 has a filter material that are nanofibers with a diameter that is within the range of five nanometers to two hundred nanometers. In one embodiment the replacement air filter 618 has a filter material that are nanofibers with a diameter that is within the range of five nanometers to two hundred nanometers and wherein some of said nanofibers in said filtering material have a diameter that is larger than two hundred nanometers.

Figure 7:
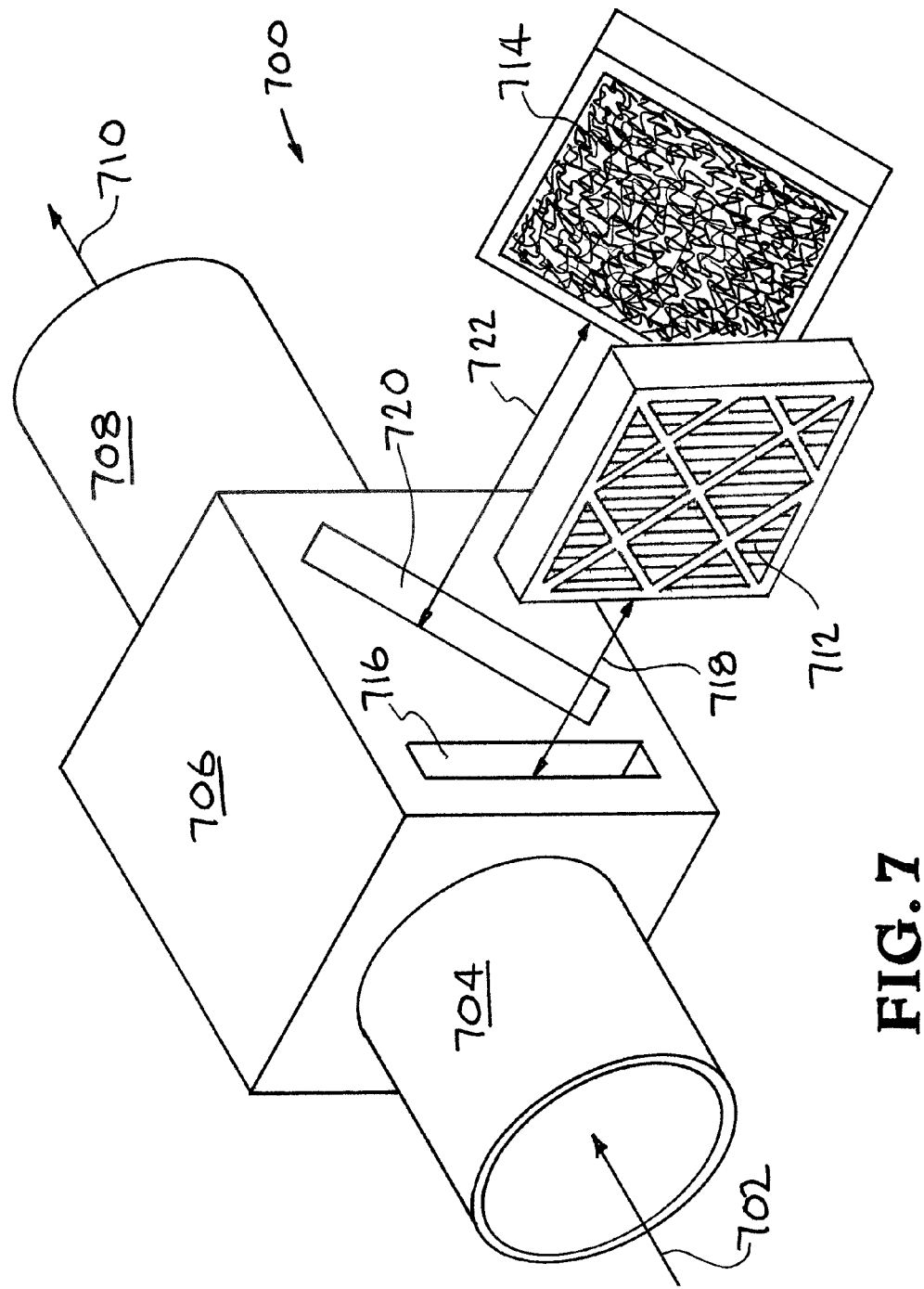
FIG. 7 illustrates yet another embodiment of an air filter replacement system of the present invention wherein an improved air filter that removes radiological or biological or aerosol particles is used together with an existing prior art air filter.

Referring now to FIG. 7, yet another embodiment of a filter system of the present invention is illustrated. The filter system is designated generally by the reference numeral 700. The filter system 700 provides protection from biological and radiological aerosol attack. The filter system 700 is an air filter replacement system wherein an existing prior art air filter is replaced with an improved replacement air filter that removes radiological or biological or aerosol particles and a prior art air filter acts as a pre-filter.

The filter system 700 provides an air filter replacement system for existing buildings, vehicles, arenas, and other enclosed airspaces. As illustrated in FIG. 7, the existing air ducts 704 and 708 are part of a building's, vehicle's, arenas' or other enclosed air space's air circulation system. The arrows 702 and 710 illustrate the air flow through the air duct 704, the plenum 706, the air filter, and the air duct 708. The air ducts 702 and 708 are connected to a plenum 706 having openings 716 and 720 for the air filters.

An improved replacement air filter 714 that removes radiological or biological or aerosol particles is used with a prior art air filter 712 and the prior art air filter 712 acts as a pre-filter for the improved replacement air filter 714. The prior art air filter 712 is a standard air filter that has filter media of material such as glass fibers to remove contaminants such as dust, mold, and particles from the air as the air passes through the prior art air filter 712. The improved replacement air filter 714 is positioned an an angle and leaning into the plenum 706. This allows the use of a larger improved replacement air filter 714 and provides the benefit of lower pressure drop relative to a smaller area replacement filter.

Figure 6:
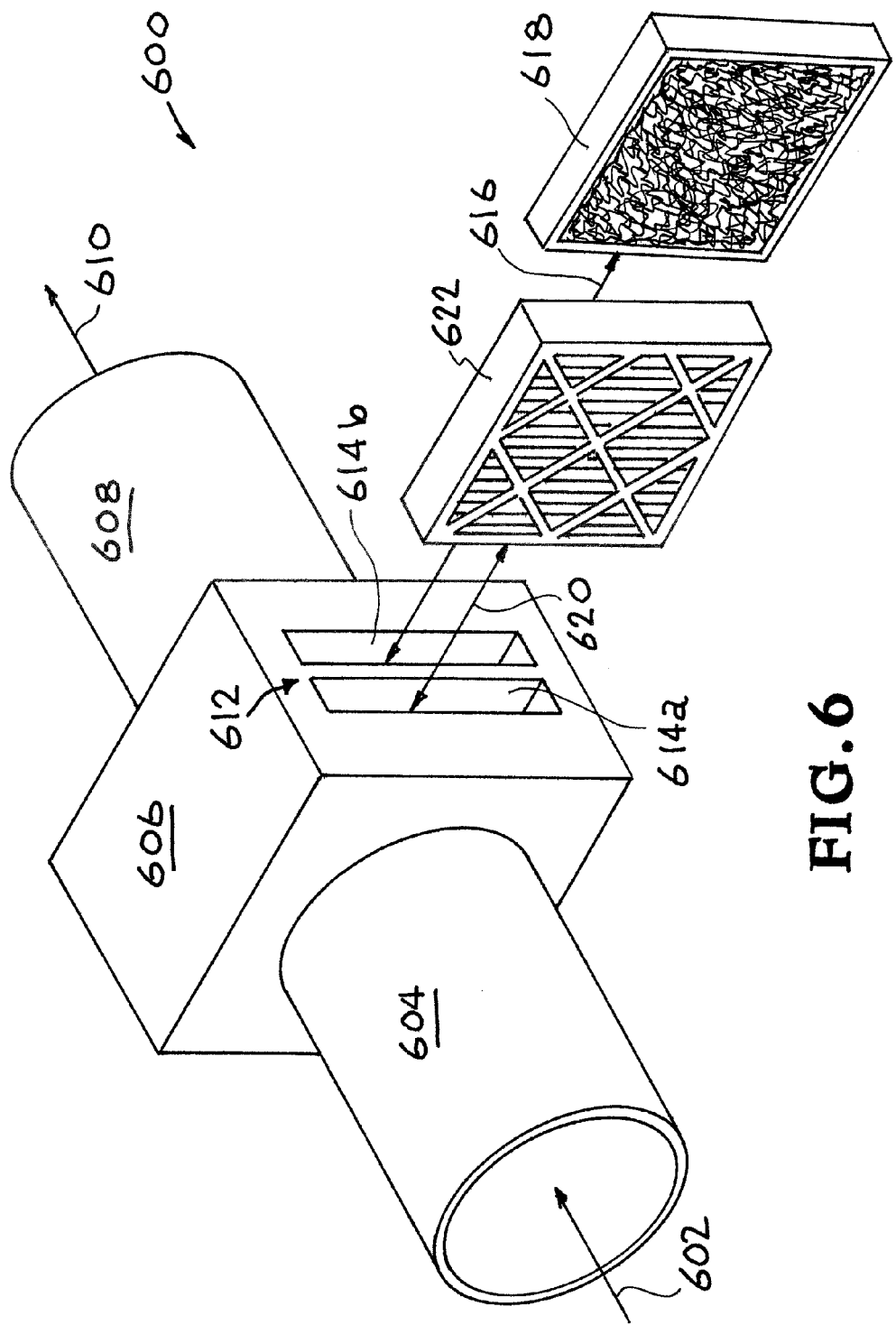
FIG. 6 illustrates another embodiment of an air filter replacement system of the present invention wherein an improved air filter that removes radiological or biological or aerosol particles is used together with an existing prior art air filter.

The replacement air filter 714 has filter material that removes the radiological or biological or aerosol particles. The insertion of the prior art air filter 712 into the plenum 706 is represented by the double headed arrow 718. The insertion of the improved replacement air filter 714 into the plenum 706 is represented by the double headed arrow 722. As described previously with respect to FIG. 6 there is a benefit to reduced pressure drop in maintaining air flow.

The filter system 700 provides protection of any enclosed airspace that is a gathering area for people. The filter system 700 has use in buildings, vehicles, arenas, and other enclosed airspaces that are a gathering area for people. The filter system 700 provides an air filter replacement system for existing buildings, vehicles, arenas, and other enclosed airspaces. The replacement air filter 714 has a filter material that removes the radiological or biological or aerosol particles. In one embodiment the replacement air filter 714 has a filter material that are nanofibers. In one embodiment the replacement air filter 714 has a filter material that are ceramic nanofibers. In one embodiment the replacement air filter 714 has a filter material that are nanofibers with a diameter that is within the range of one nanometer to two hundred nanometers. In one embodiment the replacement air filter 714 has a filter material that are nanofibers with a diameter that is within the range of five nanometers to two hundred nanometers. In one embodiment the replacement air filter 714 has a filter material that are nanofibers with a diameter that is within the range of five nanometers to two hundred nanometers and wherein some of said nanofibers in said filtering material have a diameter that is larger than two hundred nanometers.

In another embodiment the invention may be utilized in improving the filtrations efficiency or amount of cleaning of air in other air cleaning applications in the pharmaceutical, semiconductor, medical (including hospitals), nuclear, chemical, laboratory (including fume hoods), and other industrial or commercial uses where the cleaning of air or process gases is useful.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An apparatus for removal of radiological or biological or aerosol particles from within air inside of an enclosed airspace that is a gathering area for people, wherein the airspace has an air flow system that provides an air flow stream with a standard air filter of predetermined dimensions positioned so that the air stream passes through the standard filter; comprising:

a plenum positioned so that the air stream passes through said plenum;

an inlet air duct connected to said plenum, said inlet air duct positioned so that the air stream passes through said inlet air duct and into said plenum;

an outlet air duct connected to said plenum, said outlet air duct positioned so that the air stream passes from said plenum into said outlet air duct;

a standard air filter opening in said plenum for the standard air filter, said standard air filter opening positioned so that the air stream passes through the standard air filter in said plenum;

a replacement air filter, said replacement air filter having dimensions that are the same as the predetermined dimensions of the standard air filter;

a replacement air filter opening in said plenum for said replacement air filter, said replacement air filter opening positioned so that the air stream passes through said replacement air filter in said plenum; and a nano-fiber filter material in said replacement air filter wherein the air stream passes through said nano-fiber material, said nano-fiber filter material including a nano-fiber mat that removes the radiological or biological or aerosol particles as the air stream passes through said nano-fiber material mat.

2. The apparatus for removal of radiological or biological or aerosol particles from within air inside of an enclosed airspace that is a gathering area for people of claim 1 wherein said nano-fiber filter material in said replacement air filter are ceramic nanofibers.

3. The apparatus for removal of radiological or biological or aerosol particles from within air inside of an enclosed airspace that is a gathering area for people of claim 1 wherein said nano-fiber filter material in said replacement air filter are ceramic nanofibers on a porous ceramic substrate.

4. The apparatus for removal of radiological or biological or aerosol particles from within air inside of an enclosed airspace that is a gathering area for people of claim 1 wherein said nano-fiber filter material in said replacement air filter are amorphous inorganic nanofibers.

5. The apparatus for removal of radiological or biological or aerosol particles from within air inside of an enclosed airspace that is a gathering area for people of claim 1 wherein said nano-fiber filter material in said replacement air filter are nanofibers and wherein said nanofibers have a diameter that is within the range of one nanometer to two hundred nanometers.

6. The apparatus for removal of radiological or biological or aerosol particles from within air inside of an enclosed airspace that is a gathering area for people of claim 1 wherein said nano-fiber filter material in said replacement air filter are nanofibers and wherein said nanofibers have a diameter that is within the range of five nanometers to two hundred nanometers.

7. The apparatus for removal of radiological or biological or aerosol particles from within air inside of an enclosed airspace that is a gathering area for people of claim 1 wherein said nano-fiber filter material in said replacement air filter are nanofibers and wherein said nanofibers have a diameter that is within the range of five nanometers to two hundred nanometers and wherein some of said nanofibers in said filtering material have a diameter that is larger than two hundred nanometers.

8. The apparatus for removal of radiological or biological or aerosol particles from within air inside of an enclosed airspace that is a gathering area for people of claim 1 wherein said nano-fiber filter material in said replacement air filter is a mat of ceramic nano-fibers.

9. The apparatus for removal of radiological or biological or aerosol particles from within air inside of an enclosed airspace that is a gathering area for people of claim 1 wherein said nano-fiber filter material in said replacement air filter is a mat of nano-fibers on a highly porous substrate.

10. The apparatus fix removal of radiological or biological or aerosol particles from within air inside of an enclosed airspace that is a gathering area for people of claim 1 wherein said nano-fiber filter material in said replacement air filter is a mat of ceramic nano-fibers on a porous ceramic substrate.

11. The apparatus for removal of radiological or biological or aerosol particles from within air inside of an enclosed airspace that is a gathering area for people of claim 1 wherein said nano-fiber filter material in said replacement air filter is a pleated mat of nano-fibers.

12. The apparatus for removal of radiological or biological or aerosol particles from within air inside of an enclosed airspace that is a gathering area for people of claim 1 wherein the standard air filter is positioned adjacent said replacement air filter, and wherein the standard air filter is a prefilter for said replacement air filter.

13. The apparatus for removal of radiological or biological or aerosol particles from within air inside of an enclosed airspace that is a gathering area for people of claim 12 wherein said replacement air filter is positioned at an angle to the standard air filter.

14. An apparatus for removal of radiological or biological or aerosol particles from within air inside of an enclosed airspace that is a gathering area for people, wherein the airspace has an air flow system that provides an air flow stream with a standard air filter of predetermined dimensions positioned so that the air stream passes through the standard filter; comprising:
  a plenum positioned so that the air stream passes through said plenum;
  an inlet air duct connected to said plenum, said inlet air duct positioned so that the air stream passes through said inlet air duct and into said plenum;
  an outlet air duct connected to said plenum, said outlet air duct positioned so that the air stream passes from said plenum into said outlet air duct;
  a standard air filter opening in said plenum for the standard air filter, said standard air filter opening positioned so that the air stream passes through the standard air filter in said plenum;
  a replacement air filter, said replacement air filter having dimensions that are the same as the predetermined dimensions of the standard air filter;
  a replacement air filter opening in said plenum for said replacement air filter, said replacement air filter opening positioned so that the air stream passes through said replacement air filter in said plenum; and
  nano-fiber filter means including a nano-fiber mat in said replacement air filter, wherein the air stream passes through said nano-fiber filter means including a nano-fiber mat, said nano-fiber filter means being a nano-fiber filter means for removing the radiological or biological or aerosol particles as the air stream passes through said nano-fiber filter means.

15. The apparatus for removal of radiological or biological or aerosol particles from within air inside of an enclosed airspace that is a gathering area for people of claim 14 wherein said nano-fiber filter means in said replacement air filter is a mat of nano-fibers.

16. The apparatus for removal of radiological or biological or aerosol particles from within air inside of an enclosed airspace that is a gathering area for people of claim 14 wherein said nano-fiber filter means in said replacement air filter is a mat of nano-fibers on a porous ceramic substrate.

17. The apparatus for removal of radiological or biological or aerosol particles from within air inside of an enclosed airspace that is a gathering area for people of claim 14 wherein said nano-fiber filter means in said replacement air filter is a pleated mat of nano-fibers.

18. The apparatus for removal of radiological or biological or aerosol particles from within air inside of an enclosed airspace that is a gathering area for people of claim 14 wherein said nano-fiber filter means in said replacement air filter are nanofibers and wherein said nanofihers have a diameter that is within the range of one nanometer to two hundred nanometers.

19. The apparatus for removal of radiological or biological or aerosol particles from within air inside of an enclosed airspace that is a gathering area for people of claim 14 wherein said nano-fiber filter means in said replacement air filter are nanofibers and wherein said nanofibers have a diameter that is within the range of five nanometers to two hundred nanometers.

20. The apparatus for removal of radiological or biological or aerosol particles, from within air inside of an enclosed airspace that is a gathering area for people of claim 14 wherein said nano-fiber filter means in said replacement air filter are nanofibers and wherein said nanofibers have a diameter that is within the range of five nanometers to two hundred nanometers and wherein some of said nanofibers in said filtering material have a diameter that is larger than two hundred nanometers.

* * * * *